Aug. 23, 1927.

W. F. GROENE 1,639,995

TOOL FEED FOR MACHINE TOOLS

Filed May 23, 1924

Inventor
WILLIAM F. GROENE.

By Murray and Gugelter

Attorneys

Patented Aug. 23, 1927.

1,639,995

UNITED STATES PATENT OFFICE.

WILLIAM F. GROENE, OF CINCINNATI, OHIO, ASSIGNOR TO THE R. K. LEBLOND MACHINE TOOL COMPANY, OF CINCINNATI, OHIO, A CORPORATION OF DELAWARE.

TOOL FEED FOR MACHINE TOOLS.

Application filed May 23, 1924. Serial No. 715,487.

An object of my invention is to provide a simple and efficient feed for the cutting tools of machine tools such as lathes.

Another object of my invention is to provide a device having a minimum of parts.

These and other objects are attained by the means described herein and disclosed in the accompanying drawings, in which.

Figure 1:
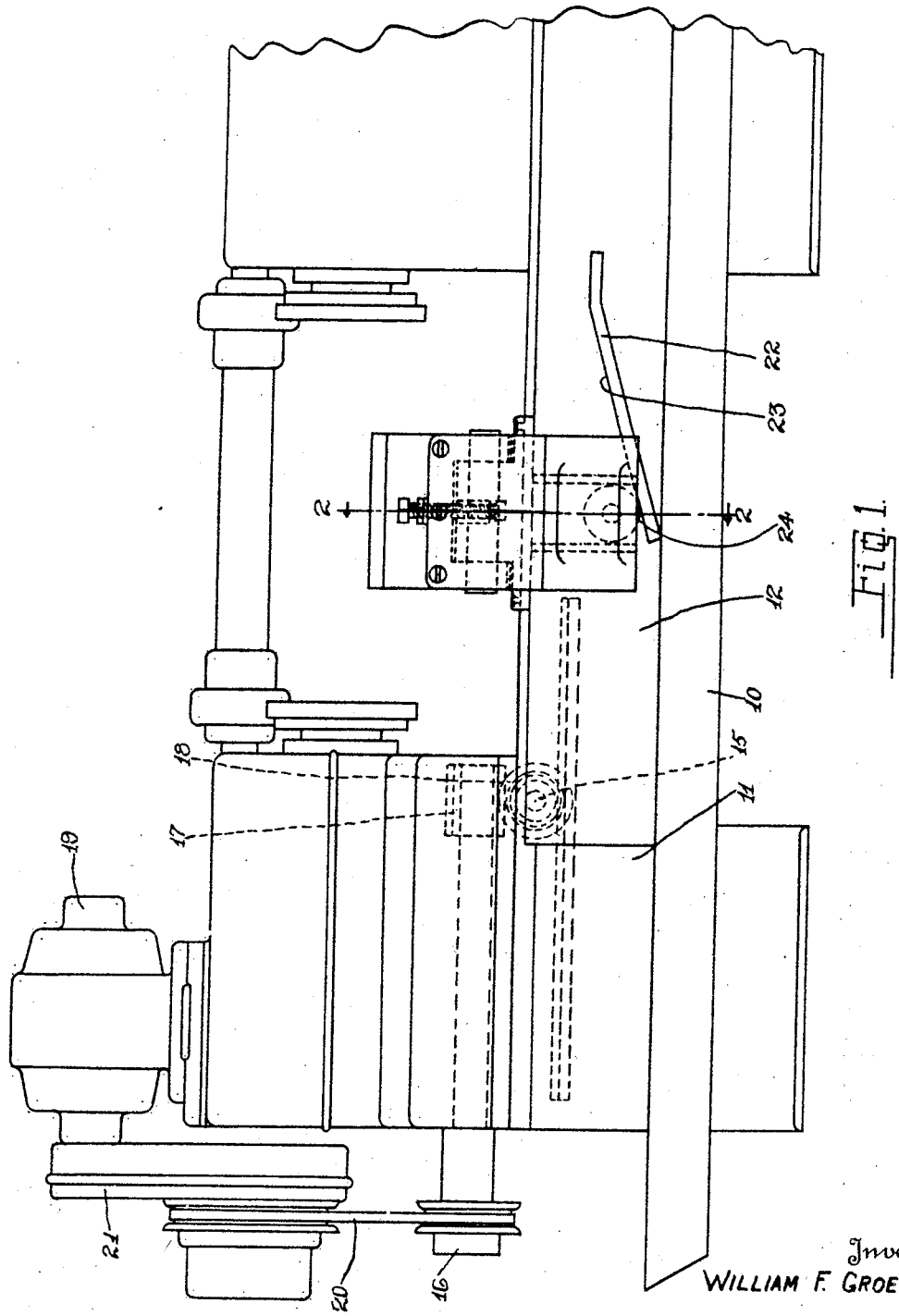
Fig. 1 is a fragmental elevation of a lathe having mounted on it a tool feeding means embodying my invention.

The lathe bed 10 is provided on its faces with dove-tailed ways 11 in which are reciprocally received carriages 12. The carriages 12 may be moved longitudinally of the bed by means of racks 13 mounted on the carriages 12 and which racks are engaged by pinions 14 mounted on the shaft 15. The shaft 15 may be driven from the shaft 16 in any suitable manner such as by means of a worm 17 and worm wheel 18, associated with the shafts 15 and 16. The shaft 15 in turn may be driven from the motor 19 in any suitable manner, for example by suitable pulleys and gear reductions 20 and 21.

The carriage 12 has mounted on it a cam bar 22 having its upper face 23 exposed to and engaged by a roller 24. The roller 24 is carried by the lower end of a vertically reciprocating slide 25. The slide 25 is of a dove-tailed structure that is reciprocally received in a dove-tailed way 26 formed between the block 27 and the carriage 28. The carriage 28 is adapted to be adjusted longitudinally of the lathe bed and is to be secured in various adjusted positions by any suitable means such as bolts.

Figure 2:
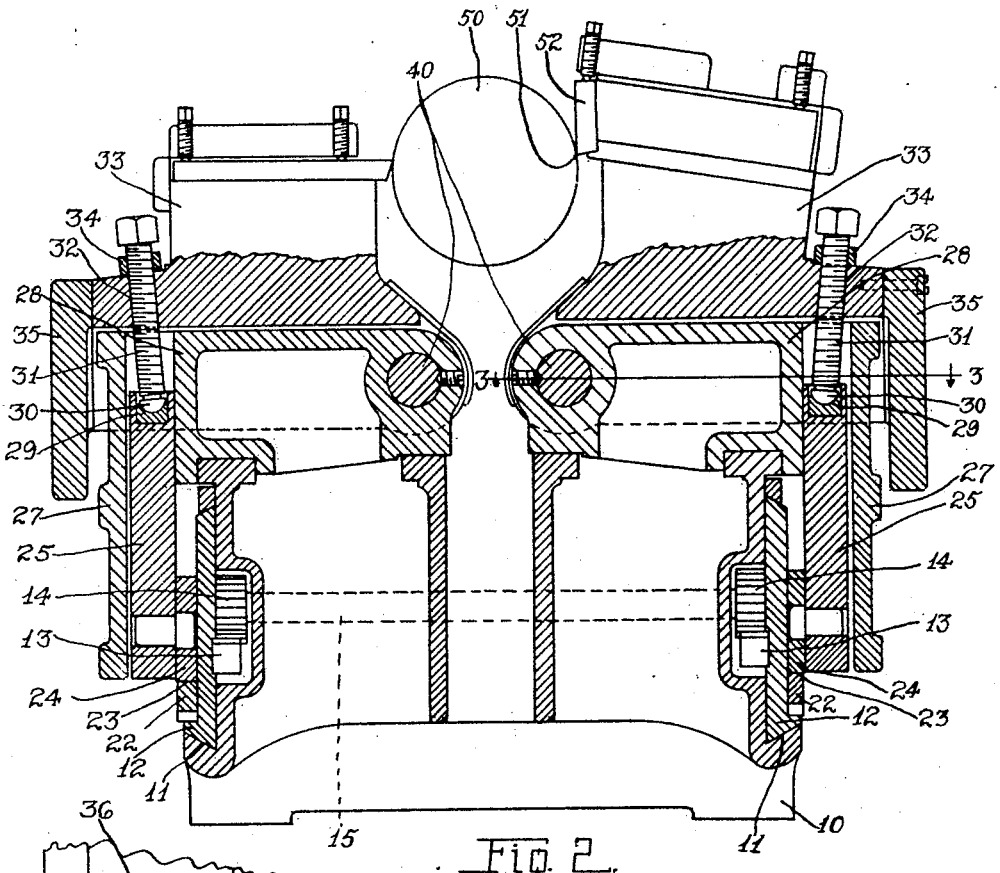
Fig. 2 is an enlarged sectional view on line 2—2 of Fig. 1.
Figure 3:
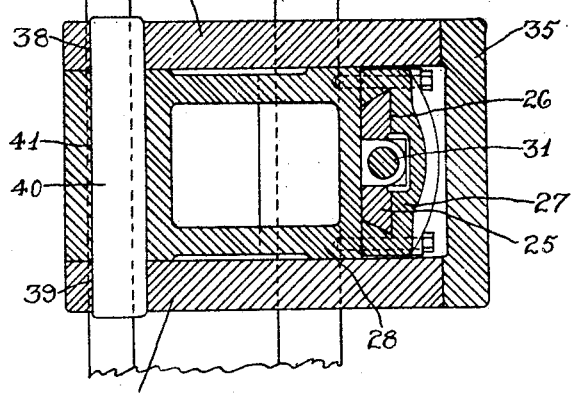
Fig. 3 is a sectional view on line 3—3 of Fig. 2.

The upper end of the slide 25 is provided with a ball socket 29 adapted to receive the semi-globular head 30 formed on a screw 31 that extends through a threaded bore 32 in the base of a tool holder 33. A suitable lock nut 34 is associated with the screw 31 and the tool holder 34 for locking the screw in various adjusted positions. A weight 35 is associated with the tool holder 33 and serves to retain the head 30 on the socket 29. The tool holder 33 is provided with depending sides 36 and 37 provided with aligned bores 38 and 39 adapted to receive the shaft 40. The intermediate portion of the shaft 40 is received in the bore 41 formed in the carriage 28. The shaft 40 functions as the axis or fulcrum about which the tool holder 33 moves. The operation of my device is as follows:

The work 50, see Fig. 2, would move in a counter-clockwise direction against the cutting edge 51 of the tool 52. The pressure exerted by the work against the cutting tool would tend to move the tool holder 33 in a clockwise direction about the shaft 40 as an axis, thereby directing this pressure through screw 31 and socket 29 upon slide 25, roller 24 and cam bar 23. It would therefore follow that the pressure exerted on the cutting tool by engagement of the tool on the work is utilized in retaining the roller 24 and the upper inclined face 23 of cam bar 22 in engagement as the carriage 12 is moved longitudinally of the lathe bed for causing the roller to ascend the inclined upper face 23 of the cam bar 22.

The tool disposed at the left of the work, see Fig. 2, would have a downward pressure directed upon it. It will be noted that the axis about which this tool moves is below the axis of the work and at one side of the vertical plane passing through the axis of the work. The axes about which the tools move may be said to be to the outside, relative to the axis of work. It is therefore evident that the strain directed upon the tool is in this instance transmitted to the carriage 28 and to the screw 31, wherefore the movement of the cam bar serves to actuate the tool holder about the axis of shaft 40.

What I claim is:

1. In a device of the class described the combination with a lathe bed, having a way extending longitudinally thereof, of a carriage reciprocally mounted in the way, means for reciprocating the carriage in the way, a cam bar carried by the carriage, a second carriage mounted on the lathe bed, a shaft carried by the second carriage and having its axis extending longitudinally of the bed, the axis of said shaft being disposed below the center of work to be received by the lathe and adjacent the vertical plane extending through the center of such work, a tool holder having a pivotal mounting on the shaft and having a threaded bore, a screw extending adjustably through the threaded bore and adapted to be locked against movement relative to the tool holder, the screw having a semi-globular head at its lower end, a reciprocating slide carried by the second mentioned carriage and having a socket for the reception of the head on the screw, and a connection between the reciprocating slide and the cam bar.

2. In a device of the class described the combination of a lathe bed having a longitudinally extending way therein, a carriage reciprocally mounted in the way, a cam bar carried by said carriage, a second carriage mounted on the lathe bed, a tool holder having a trunnioned mounting on said second carriage and adapted to carry a tool transversely of the bed as it is moved about its mounting, a slide mounted on said second carriage and vertically reciprocable thereon as the cam bar is moved longitudinally of the bed, and connecting means carried by the tool holder and having a swiveled connection with the slide.

3. In a device of the class described the combination of a lathe bed, a cam bar reciprocable longitudinally of said bed, a carriage mounted on the bed, a tool holder having a trunnioned mounting on said carriage for moving a tool transversely of the bed, a vertically reciprocable slide on the carriage adapted to be reciprocated upon movement of the cam bar, and depending means adjustably mounted on the tool holder and having a swiveled connection with the slide.

In testimony whereof, I have hereunto subscribed my name this 13th day of May, 1924.

WILLIAM F. GROENE.